D. J. OGILVY.
PROCESS FOR RECOVERING THE RESINOUS PRODUCTS FROM ROSIN WASTE AND THE LIKE.
APPLICATION FILED JAN. 6, 1906.
1,014,411.
Patented Jan. 9, 1912.
2 SHEETS—SHEET 1.
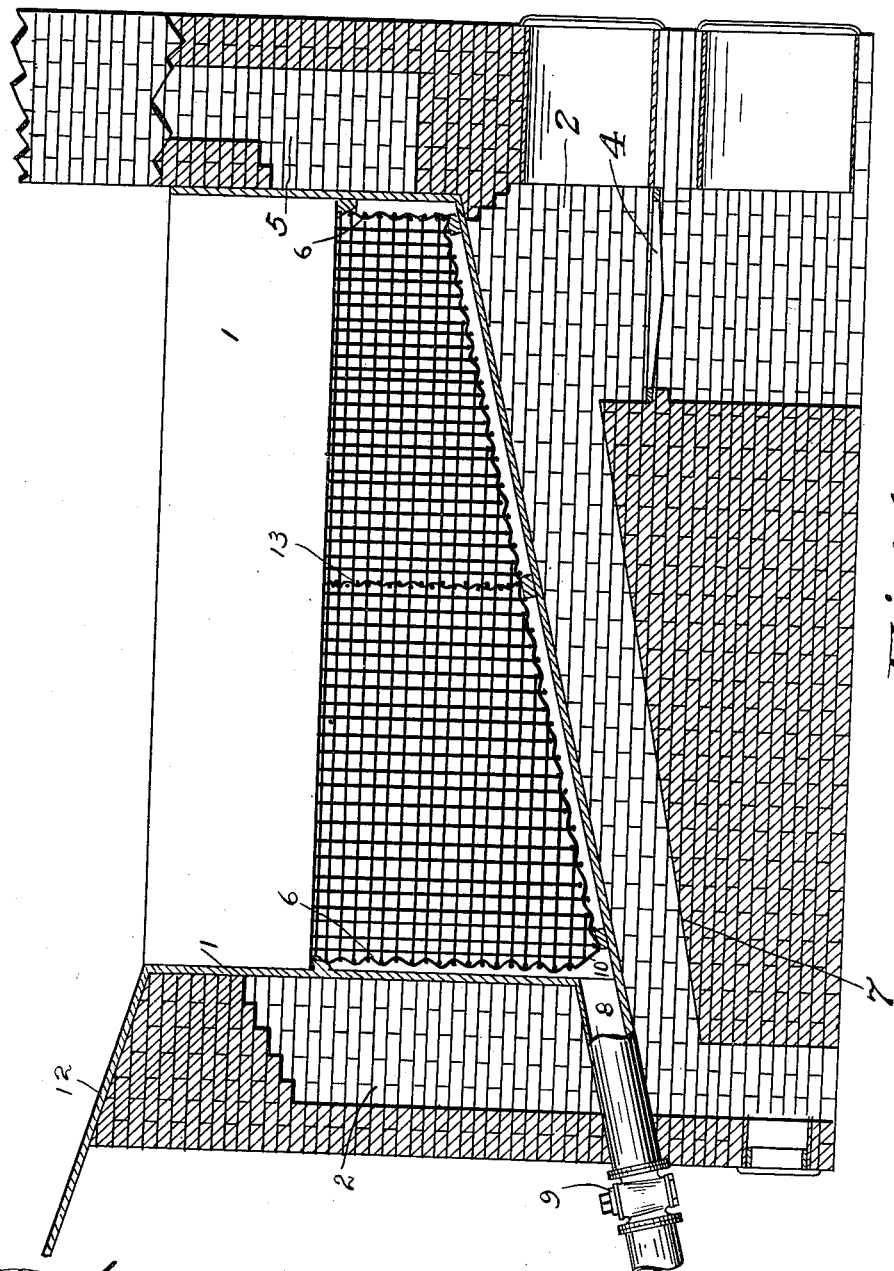

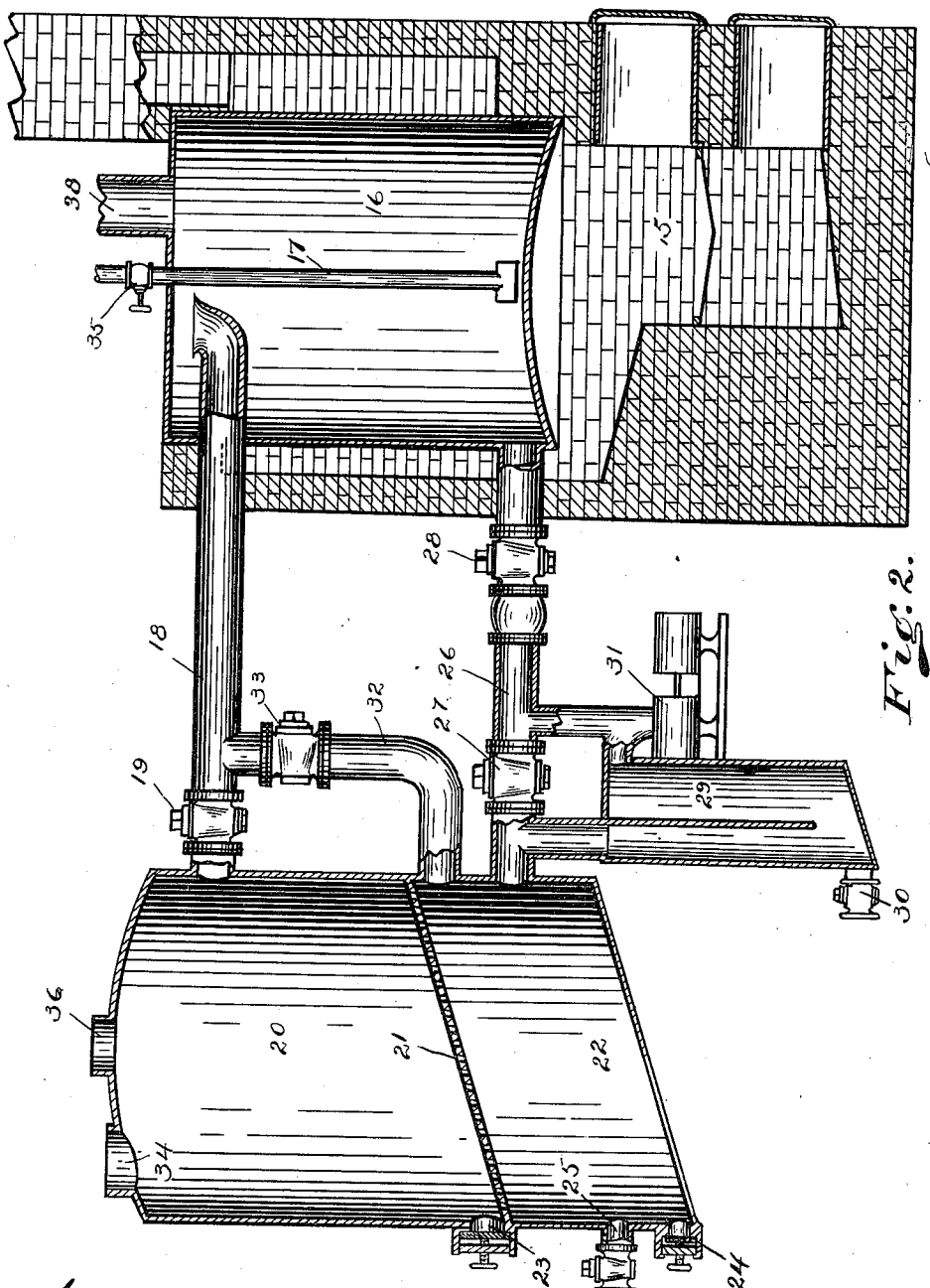

UNITED STATES PATENT OFFICE.

DAVID J. OGILVY, OF CINCINNATI, OHIO.

PROCESS FOR RECOVERING THE RESINOUS PRODUCTS FROM ROSIN WASTE AND THE LIKE.

1,014,411.  Specification of Letters Patent.  Patented Jan. 9, 1912.

Application filed January 6, 1906. Serial No. 294,938.

*To all whom it may concern:*

Be it known that I, DAVID J. OGILVY, a citizen of the United States, residing in Cincinnati, in the county of Hamilton and State of Ohio, have invented a certain new and useful Process for Recovering the Resinous Products from Rosin Waste and the Like, of which the following is a full, clear, and exact description.

The object of this invention is to extract and utilize the resinous constituents from the waste and refuse resulting from the manufacture and handling of rosins. This material is found on the market under such names as rosin scrap, dross, waste, skimmings, etc. and in another form under the title of cotton batting dross, the latter resulting from the straining of the crude rosin or gum through cotton batting. These waste products usually consist of rosin, sand, clay, wood etc., and in the case of cotton batting dross cotton is present which renders the dross very difficult to disintegrate.

The ordinary method of utilizing rosin waste has been simply to heat the waste and to separate what rosin becomes liquid by skimming or otherwise. This method requires a considerable heat to enable the rosin to separate in a reasonable time on account of the large quantity of infusible matter present in the scrap, which renders the scrap difficult to disintegrate. The product from this method is very dark colored and the wear and tear of the apparatus excessive.

Another method of extracting the resinous matter from rosin waste is by the action of volatile solvents, such as benzin, gasolene etc., which requires special apparatus and is subject to the dangers incident to the handling of these dangerous volatile solvents, in addition to the expense of recovering the solvent and the rosin. In my present application the resinous matter contained in the rosin waste is separated from the insoluble-in-oil matter in a safe and simple manner and the resulting product is in a convenient form for utilization.

The process is as follows: Into a suitable vessel I introduce a high fire test petroleum such as paraffin oil of a specific gravity 0.89 and apply heat, at the same time adding the rosin waste. The rosin waste quickly disintegrates resulting in a resinous solution and the separation of the insoluble-in-oil matter. The resinous solution is viscous according to the proportions of rosin waste and petroleum oil operated on; as, for example, with equal parts of rosin waste and petroleum oil a viscous oily liquid is obtained while with the addition of a less quantity of petroleum oil a still more viscous product, like pitch, is produced. By a high fire test petroleum oil is understood the heavy mineral oils, either natural or refined, compared with the ordinary solvents, benzin and gasolene. When natural mineral oils are used it is desirable to remove the light and easily volatile constituents first, their presence being objectionable on account of the extra risk from fire and the extra time necessary in getting the mixture of oil and waste to the desired temperature to attain a speedy solution of the resinous matter.

When conducting this process with the open vessel apparatus, such as is illustrated in Figure 1, the high fire test oils are safest, as for example, paraffin oil of a specific gravity 0.89, or a Texas mineral oil of a specific gravity of 0.95, but when the process is conducted in a closed vessel such as is illustrated in Fig. 2, then a neutral oil can be used of a specific gravity 0.85.

The designation "neutral oil" is intended to indicate an oil which has not been treated with acids, and which is therefore free from acid and neutral.

The resinous solutions obtained from the process may be utilized for many purposes to which rosin is applied, as, for example, making printing ink vehicles, brewers' pitch, and rosin oil can be obtained by distilling the clarified resinous mixture and fractionating the distillate.

In the drawings Fig. 1 is a sectional side elevation of one construction of apparatus for carrying out my process. Fig. 2 is a similar sectional side elevation of another construction of apparatus.

1 is an open metal tank of suitable dimensions properly mounted over a furnace 2, grate bars 4, and fire-flue 5, of any suitable furnace construction, 6 is a tray or basket of strong wire or perforated metal mounted so as to rest near the bottom of the tank, and thus to prevent the burning and caking of the rosin waste, and arranged so that any required movement may be communicated to the basket to unload the insoluble in oil matter by hoisting. The tank 1 is provided with an inclined bottom 7, as shown in Fig. 1, and at the low end with a discharge outlet 8, controlled by the valve 9. The tray 6 has an opening 10 to discharge into this outlet. In operating this form of apparatus the oil and waste in the tank 1 is heated by the furnace, the rosin waste quickly disintegrates furnishing a resinous solution and the insoluble-in-oil matter either floats or settles and is easily separated from the resinous solution.

In Fig. 2 I show a modified construction in which 15 is the furnace, and 16 a tank or still placed over the furnace 15. 20 is a tank with inclined bottom 22 and connected by a pipe 18 with the tank 16. The tank 20 is provided with a false bottom, of mesh or perforated metal, 21, which is inclined as shown. 23 is an opening in the tank 20 at the lower end of the false bottom. 24 is an opening at the bottom of the tank, and 25 an intermediate opening. These three openings are arranged one above the other for withdrawing the contents of the tank. The opening 23 is used for withdrawing the treated waste. The intermediate opening 25 is used for drawing off the liquid contents of the tank, and the lower opening is used for removing the grit and sediment which settles along the inclined bottom 22 of the tank. The lower part of the tank 20 is connected with the still 16 by the pipe 26, controlled by the valves 27 and 28, and a trap 29 is preferably provided for this pipe with a valve controlled outlet 30 at the bottom, and a pump 31 is employed to pump the oil from the trap into the still 16. 32 is a branch pipe from the pipe 18 to the tank 20 a short distance below the false bottom 21 and this pipe is controlled by valve 33. The pipe 17, is used for introducing steam for cleaning purposes. The opening 38 on the top of the still 16 is intended for connection with a condenser to save escaping vapors and as an overflow should the resinous mixture in the still require it. The opening 36 in the top of the tank 20 is also intended for connection with the condenser and as an overflow. In operating this form of apparatus the resinous waste is introduced into the tank 20 through the opening 34. The still 16 is filled with the high fire test petroleum which overflows into pipe 18, and fills the tank 20 to a corresponding level, the valve 33 being shut and the valves 19, 27 and 28 being open. Heat is then applied to the still 16 by the furnace and the heated oil will cause a circulation between the still and the tank through the connecting pipes 18 and 26. The trap 29 is used to prevent the entrance of grit or sediment into the still 16 during the circulation and the pump 31 may be used to assist the circulation. Heat is applied as in the more simple apparatus shown in Fig. 1 and the process is continued until the oil is sufficiently charged with rosin. Fresh rosin waste may be added to the tank 20 or the resinous solution may be drawn off and fresh oil added until the waste is sufficiently freed from resinous matter. When the waste has been sufficiently exhausted the fibrous residue may be removed at the opening 23 and the heavier residue by the opening 24 and the resinous solution through the opening 25.

Having thus described my invention, what I claim as new and desire to secure by Letters Patent is:

1. The herein described process for extracting the resinous matter from the waste resulting from the manufacture and handling of rosin, and which process consists in digesting the rosin waste in heated mineral oils ranging in specific gravity from 0.845 and upward, then separating the resinous solution from the insoluble in the oil matter.

2. The herein described process of producing resinous solution by digesting rosin waste in heated mineral oils ranging in specific gravity from 0.845 and upward, and then clarifying the resulting solution.

DAVID J. OGILVY.

Witnesses:
R. O. HARGITT,
GLENA PRITCHARD.